United States Patent
Gorywoda et al.

[11] Patent Number: 6,089,051
[45] Date of Patent: Jul. 18, 2000

[54] WARP-KNIT FABRIC OF NOBLE METAL-CONTAINING WIRES, AND METHOD FOR THE PRODUCTION THEREOF

[75] Inventors: Marek Gorywoda, Hanau; Michael Hörmann, Mömbris; Günter Lindenmayer, Bad Orb; David Francis Lupton, Gelnhausen; Bruno Streb, Freigericht, all of Germany

[73] Assignee: W.C. Heraeus GmbH, Hanau, Germany

[21] Appl. No.: 08/149,980

[22] Filed: Nov. 10, 1993

[30] Foreign Application Priority Data

Jan. 14, 1993 [DE] Germany .............................. 43 00 791

[51] Int. Cl.[7] .................................................. D04B 21/12
[52] U.S. Cl. ................................ 66/170; 66/195; 66/202; 442/316
[58] Field of Search ..................... 428/242, 256, 428/328; 66/203, 169 R, 170, 192, 195, 202; 55/DIG. 43, 525; 442/316

[56] References Cited

U.S. PATENT DOCUMENTS

| | | | |
|---|---|---|---|
| 2,274,684 | 3/1942 | Goodloe | 55/DIG. 43 |
| 3,127,306 | 3/1964 | Turton et al. | 66/195 |
| 3,874,645 | 4/1975 | Aguinet et al. | 267/112 |
| 4,609,923 | 9/1986 | Boan et al. | 66/202 |
| 4,869,891 | 9/1989 | Handley | 428/246 |
| 5,188,813 | 2/1993 | Fairey et al. | 66/202 X |
| 5,268,157 | 12/1993 | Blass et al. | 423/403 |

FOREIGN PATENT DOCUMENTS

| | | |
|---|---|---|
| 364153 | 4/1989 | European Pat. Off. . |
| 734597 | 10/1932 | France ..................... 66/195 |
| 2433975 | of 1980 | France . |
| 4206199 | 12/1992 | Germany . |
| 9202301 | 2/1992 | WIPO . |

OTHER PUBLICATIONS

Verlag Werkgemeinschaft Karl Meyer E. V., "Die Maschenbindungen der Kettenwerkere," pp. 18 & 67.

Raz, S. "Warp Knitting Production" pp. 5, 64–65, 516–517 (1987).

Iyer "Circular Knitting" pp. 1, 2, 6, 7, 9 (1992).

*Primary Examiner*—Danny Worrell
*Attorney, Agent, or Firm*—Fulbright & Jaworski L.L.P.

[57] ABSTRACT

Fine-mesh warp-knit fabrics of noble metal-containing wires with high specific surface areas, having good mechanical stability, are produced by warp-knitting noble metal-containing wires to form closed stitches, such that the warp-knit fabric has at least 14 stitches per inch, and such that in at least one of the knit weaves forming the warp-knit fabric, the noble metal-containing wires are laid down over at least three stitch spacings.

11 Claims, 1 Drawing Sheet

WARP-KNIT FABRIC OF NOBLE METAL-CONTAINING WIRES, AND METHOD FOR THE PRODUCTION THEREOF

BACKGROUND OF THE INVENTION

The invention concerns a warp-knit fabric of noble metal-containing wires as well as a method for mechanized production of gas-permeable warp-knit lattices of noble metal-containing wires by means of a knitting loom.

Knit materials made from noble metal-containing wires and methods for the production thereof have been known for some time. For example, catalyst lattices that consist of platinum-rhodium wires with thicknesses of between 60 and 120 μm are used to catalyze the combustion of ammonia to produce nitric acid. In the corresponding combustion facilities the catalyst lattices are used, for example, transverse to the flow direction of the ammonia gas that is to be catalytically converted. Since the yield achieved in catalysis generally depends on the size of the free surface area coated with the catalytically effective material, the catalyst lattices are characterized by the largest possible surface area. At the same time, however, it is desirable for the gas flow to be impeded as little as possible, in other words for the flow resistance to be as low as possible.

Usually these catalyst lattices are manufactured from the respective noble metal wires by weaving them into webs, and are then cut to the desired dimensions. With a woven structure, however, the intersecting metal wires form only a two-layer structure of stitches. It has been found that a woven material of this type presents to a gas flow a relatively high resistance in relation to the surface area that is offered. Furthermore, the weaving of such catalyst lattices is relatively time-consuming due to the need to load the looms, and must also proceed slowly due to the limited ductility of the noble metal wires as compared to textile fibers.

EP-A1 03 64 153, to which U.S. Pat. No. 5,188,813 corresponds, describes a catalyst lattice and a method that are said to eliminate these drawbacks. In the method proposed therein for producing lattices of noble metal alloys, in particular for catalytic ammonia combustion and noble metal recovery, the noble metal alloy wires are weft-knit, together with an auxiliary thread made of natural fibers or a plastic, on a weft knitting loom. The looping which occurs during weft knitting produces a three-layer stitch structure that forms, for the same surface weight, a larger free surface area than with weaving. With this method, however, it is not possible to weft-knit pure noble metal alloy wires without auxiliary threads, since the wires break during the weft knitting process. Inclusion of the auxiliary thread has the disadvantage, however, that it must be removed before the lattices are used.

A similar method for producing gas-permeable lattices from noble metals by weft knitting wires made of platinum or palladium alloys on flat weft knitting looms is proposed in DE-C1 42 06 199. The applicability of this method is also limited, however, by the strength and ductility of the noble metal-containing wires, so that it is only suitable for weft knitting wires made of certain platinum-rhodium, platinum-palladium-rhodium, palladium-nickel, palladium-copper, and palladium-nickel-copper alloys with diameters between 50 and 120 μm and tensile strengths between 900 and 1050 N/mm².

In general, the known weft knitting methods using flat weft knitting looms are capable of producing only relatively coarse-mesh knit structures, which therefore have a low specific surface area in terms of the volume of the knit material and are mechanically labile. Although finer-mesh metal lattices can be produced by circular knitting, their web widths are limited to less than 3 meters by the circular knitting looms currently available.

A warp-knit fabric of this type and a method for producing it are described in WO 92/02301. This discloses catalyst and recovery lattices made of noble metal-containing wires, formed using a warp knitting loom with an open tricot weave.

In warp knitting as in weft knitting, the wires are looped to form a stitch structure with at least three layers, with which a greater surface area than with weaving can be obtained for the same surface weight. With the known warp knitting methods, however, only relatively loose lattices with little rigidity can be produced. In particular, the warp-knit structure formed with an open tricot weave is characterized by relatively low dimensional stability and easy displaceability, and has a relatively low specific surface area in terms of the volume occupied by the warp-knit fabric. To strengthen the open tricot weave, WO 92/02301 proposes relatively complex combination stitches, which can be produced for example with Raschel or Jacquard warp knitting techniques. Because of the low ductility and tensile and bending strength of the noble metal-containing wires as compared with textile fibers, however, knit weaves that place very high strength demands on the wires can be produced only to a limited extent or only at slow knitting speeds. In a preferred embodiment of this prior art, the noble metal-containing wires are therefore warp-knit together with a copper auxiliary thread or with synthetic fibers, or in an alternative procedure are coated with lubricant during knitting. This is designed to protect the wire against possible mechanical damage.

SUMMARY OF THE INVENTION

The underlying object of the present invention is to indicate a warp-knit fabric that has a fine mesh and good mechanical stability, made of noble metal-containing wires with high specific surface areas, as well as a simple method for the production thereof without using any auxiliary thread support.

According to the invention this object is achieved, with regard to the warp-knit fabric, by the fact that the noble metal-containing wires are warp-knit to form closed stitches. The warp-knit fabric has at least 14 stitches per inch, and in at least one of the knit loops forming the warp-knit fabric, the noble metal-containing wires are laid down over at least three stitch spacings.

Hereinafter, "stitches" are understood to mean mutually cohering thread loops that are retained in their shape at their upper and lower reversing points by other thread loops. The stitch spacing is determined, for example, by the shortest distance between the upper reversing in a stitch row. "Stitch row" refers to the stitches that are laterally adjacent to one another, while the "wales" are formed by the thread loops arranged one above the other in the adjacent stitch rows. Adjacent stitch rows are attached to one another by laying the wire from one thread loop to the reversing point of a new stitch. When the wire is laid down so that not only the stitch rows but also the wales are attached to one another, the result is a warp-knit fabric consisting of a flat structure of stitches attached to one another. It has been shown that a warp-knit fabric with sufficient mechanical stability is obtained when, in at least one of the knit loops forming the warp-knit fabric, the noble metal-containing wires are laid down over at least three stitch spacings. This imparts to the warp-knit fabric, in conjunction with its embodiment with closed stitches, a high degree of lengthwise and transverse stability that facilitates later handling during further processing or during use. Moreover, laying down over at least three needle gauge intervals produces a dense warp-knit fabric with a high surface density. It has proved necessary, even when a plurality of knit loops are combined in one warp-knit fabric, for example in order to improve its properties such as strength, extensibility, elasticity, or surface weight, to provide, in at least one of the knit loops, for the noble metal-containing wires to be laid down over at least three stitch spacings.

The configuration of the warp-knit fabric with closed stitches gives it high mechanical stability, which facilitates its production and handling during later processing and during actual use.

By setting the stitch count to at least 14 stitches per inch, the warp-knit fabric is given a fine-mesh structure with which particularly high surface weights can be obtained. In conjunction with the stitch structure generated by warp knitting, which has at least three layers, the warp-knit fabric has a particularly high specific surface area in terms of the volume occupied by the warp-knit fabric.

A warp-knit fabric that has a stitch count in the range of 18 to 32 stitches per inch has proven particularly advantageous with regard to a fine-mesh structure.

A warp-knit fabric in which, in at least one of the knit loops forming the warp-knit fabric, the noble metal-containing wires are laid down over four stitch spacings, has proven particularly successful. Warp-knit fabrics in which the noble metal-containing wires are laid in this fashion have, especially with combined knit loops extraordinarily high transverse and lengthwise stability and particularly high surface weights.

Advantageously, the warp-knit fabric consists of noble metal-containing wires with diameters between 50 μm and 200 μm. Especially in the case of warp-knit fabrics that contain predominantly platinum, it has proven advantageous to use wires with diameters between 60 μm and 76 μm, while thicker diameters are also used with palladium-containing wires.

With regard to the method, according to the invention the noble metal-containing wires are warp-knit using a warp knitting loom whose needle gauge is set to produce a warp-knit fabric with at least 14 stitches per inch, forming closed stitches. In at least one of the knit loops forming the warp-knit fabric, the noble metal-containing wires are laid down over at least three needle gauge intervals.

The embodiment of the warp-knit fabric with closed stitches gives it high mechanical stability, which in turn is required in warp knitting itself in order to withstand the high material pulling forces that are needed, especially when wide webs are produced, in order to yield a solid, stronger web of material. Furthermore, the high mechanical strength and stability of the warp-knit fabric achievable in this manner makes it easier to handle during later processing and during actual use. Surprisingly, it has been found that the demands on the strength and ductility of the noble metal-containing wires in the production of closed stitches are met by warp knitting of standard material, so that in this regard no limitations on the method according to the invention were observed.

Setting the needle gauge of the warp knitting loom to at least 14 stitches per inch generates a fine-mesh structure that allows the production of warp-knit fabrics with particularly high surface weights. In conjunction with the knit structure generated by warp knitting, which has at least three layers, a warp-knit fabric with a particularly high specific surface area in terms of the volume occupied by the warp-knit fabric can be obtained.

It has been found that a warp-knit fabric with sufficient stability is obtained when, in at least one of the knit loops forming the warp-knit fabric, the noble metal-containing wires are laid down over at least three needle gauge intervals. This imparts to the warp-knit fabric, in conjunction with its embodiment with closed stitches, a high lengthwise and transverse stability that in turn facilitates both warp knitting and later handling of the warp-knit fabric. Moreover, laying down over at least three needle gauge intervals produces a dense warp-knit fabric with a high surface density. It has proven necessary even with combinations of a plurality of knit loops in one warp-knit fabric, for example in order to improve its properties such as strength, extensibility, elasticity, or surface weight, to provide in at least one of the knit loops for the noble metal-containing wires to be laid down over at least three needle gauge intervals.

It is advantageous if, during warp knitting, a substantially uniform tensile force in the range between 50 mN and 300 mN, preferably between 70 mN and 150 mN, is applied to the wires. These tensile forces guarantee reliable casting-off of the stitch loops located on the needle tips of the warp knitting loom, with no risk of excessive stress and breakage of the noble metal-containing wires, and allows the formation of a solid, stable warp-knit fabric. To produce the densest possible warp-knit fabric, the material tension is kept low.

A method in which the warp knitting machine is set with a needle gauge in the range of 18 to 32 stitches per inch has proven especially advantageous with regard to a fine-mesh structure together with exertion of the least possible force when pulling the warp-knit fabric off the needles of the warp knitting loom.

A method in which, in at least one of the knit loops forming the warp-knit fabric, the noble metal-containing wires are laid down over four needle gauge intervals, is preferred. When the noble metal-containing wires are laid in this manner it is possible, especially with combined knit loops, to produce warp-knit fabrics with extraordinarily high transverse and lengthwise stability and particularly high surface weights, without excessive mechanical stress on the wires when they are laid.

Noble metal-containing wires with diameters between 50 μm and 200 μm have proven successful. The utilization of wires with diameters between 60 μm and 76 μm has proven favorable in particular for the production of knitted goods that contain predominantly platinum, while thicker wire diameters are also preferably used for palladium-containing wires.

A method in which a Raschel loom is used as the warp knitting loom is preferred. In this context the warp-knitted fabric forms an angle of approximately 170° with the wires delivered to the Raschel loom as warp threads, so that high thread and pulling forces, which are needed to knit a solid web from heavier material, exert a lower resultant force on the needles. The use of auxiliary threads in this context is not necessary, but depending on the type of weave and the forces acting on the wires, it may be useful to provide the wires with a liquid organic lubricant.

The invention will be explained in greater detail below with reference to exemplary embodiments.

DETAILED DESCRIPTION OF THE PREFERRED EMBODIMENT

Figure 1:
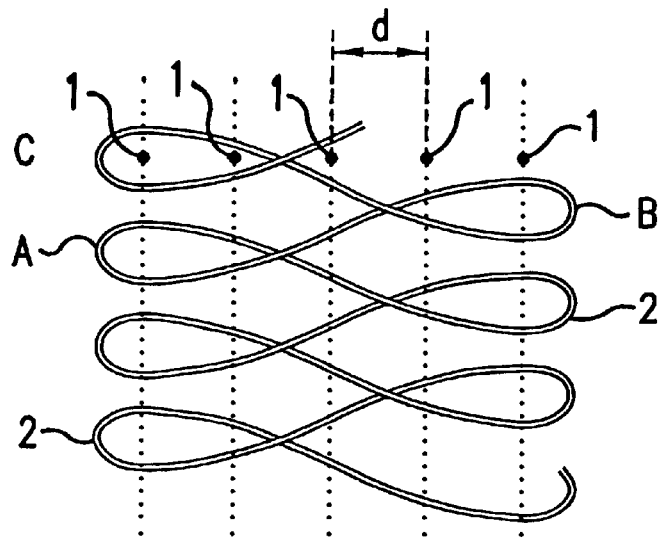
FIG. 1 is a schematic depiction of the sequence of movement as a wire is laid down to generate a warp-knit fabric according to the invention.
Figure 2:
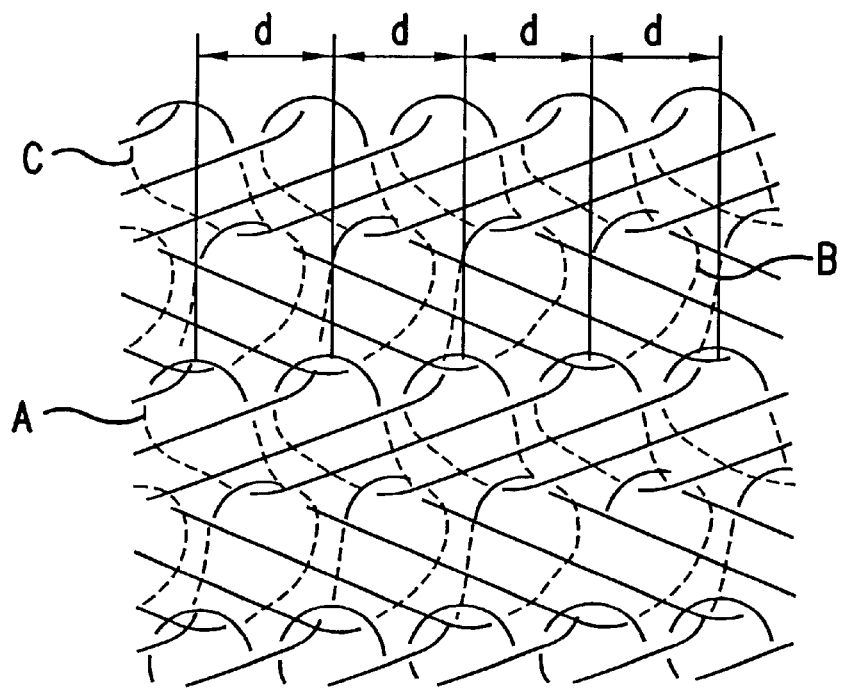
FIG. 2 is a schematic depiction of the finished warp-knit fabric showing additional loops of wire.

The needles 1 of a knitting loom, are separated from one another by distance d (the needle gauge of the knitting loom also corresponds to the value d). The stitch rows will hereafter be referred to as A, B, and C. A thread loop 2 of a PtRh10 wire proceeding from stitch row B is laid around the needles 1 of the knitting machine so that they engage, having been laid down over four needle gauge intervals d, in the next stitch row C that has yet to be produced, and attach it to stitch row B. This procedure is then continued, in each case proceeding from the stitch row that was just completed. Rows A, B, and C are also visible in the finished fabric shown schematically in FIG. 2.

Exemplary Embodiment 1

To produce a catalyst lattice for catalyzing ammonia combustion, wire made of a platinum-rhodium alloy with a weight percentage of 5% rhodium and a diameter of 76 $\mu$m is warp-knitted with a Raschel loom. For this purpose, the needle gauge of the Raschel loom is set at 28 stitches per inch. The wires, to which a uniform thread force of approximately 80 mN is applied, are laid in the form of a velvet weave, forming closed stitches with a stitch length of 1.3 mm.

The resulting web width is 3.1 m, and the knitted fabric has a surface weight of 620 g/m$^2$.

Exemplary Embodiment 2

To produce a lattice for catalysis in the production of hydrocyanic acid, a wire made of PtRh10 with a diameter of 76 $\mu$m is warp-knitted on an automatic warp knitting loom whose needle gauge is set to a stitch count of 24 stitches per inch, forming closed stitches. In this context the wires, to which a uniform tensile force of approximately 90 mN is applied, are laid in the form of a satin weave. A lattice with a web width of approximately 2.2 m, with a surface weight of approximately 550 g/m$^2$, is generated.

What is claimed is:

1. Warp-knit fabric formed by knit loops of noble metal-containing wires which are warp-knit to form closed stitches which are laterally spaced by a stitch spacing (d), the warp-knit fabric having at least 14 stitches per inch, and in at least one of the knit loops forming the warp-knit fabric, the noble metal-containing wires are laid down over at least three stitch spacings (d).

2. Warp-knit according to claim 1, wherein said fabric has a stitch count of 18 to 32 stitches per inch.

3. Warp-knit fabric according to claim 1 wherein in at least one of the knit loops forming the warp-knit fabric, the noble metal-containing wires are laid down over four stitch spacings (d).

4. Warp-knit fabric according to claim 1 wherein said fabric contains noble metal-containing wires with a diameter in the range of 50 $\mu$m to 200 $\mu$m.

5. Method for mechanized production of gas-permeable, warp-knit lattices formed by knit loops of noble metal-containing wires comprising, warp knitting the noble metal-containing wires using a warp knitting loom having needles spaced apart by a needle gauge interval (d) which is set to produce a warp-knit fabric with at least 14 stitches per inch, forming closed stitches, and laying down the noble metal-containing wires over at least three needle gauge intervals (d) in at least one of the knit loops.

6. Method according to claim 5, comprising tensioning the wires during warp knitting with a substantially uniform thread force in the range between 50 mN and 300 mN.

7. Method according to claim 5 comprising setting the needle gauge of the warp knitting loom so that knitted material with a stitch count in the range of 18 to 32 stitches per inch is obtained.

8. Method according to claim 5 wherein in at least one of the knit loops forming the warp-knit fabric, the noble metal-containing wires are laid down over four needle gauge intervals (d).

9. Method according to claim 5 wherein wires with a diameter between 50 $\mu$m and 200 $\mu$m are used.

10. Method according to claim 5 wherein a Raschel loom is used as the warp knitting loom.

11. Method as in claim 6 wherein the wires are tensioned with a substantially uniform thread force in the range between 70 mN and 150 mN.

* * * * *